US 11,583,775 B1

(12) United States Patent
Guida et al.

(10) Patent No.: US 11,583,775 B1
(45) Date of Patent: Feb. 21, 2023

(54) SYSTEM AND METHOD FOR PROVIDING PLAYER DIRECTED CONTENT IN A GAMING MACHINE

(71) Applicants: Gregory D. Guida, Gulfport, MS (US); Lester J. McMakin, III, Gulfport, MS (US)

(72) Inventors: Gregory D. Guida, Gulfport, MS (US); Lester J. McMakin, III, Gulfport, MS (US)

( * ) Notice: Subject to any disclaimer, the term of this patent is extended or adjusted under 35 U.S.C. 154(b) by 0 days.

(21) Appl. No.: 17/143,767

(22) Filed: Jan. 7, 2021

Related U.S. Application Data

(60) Provisional application No. 62/958,230, filed on Jan. 7, 2020.

(51) Int. Cl.
*A63F 13/67* (2014.01)
*A63F 13/537* (2014.01)
*A63F 13/35* (2014.01)

(52) U.S. Cl.
CPC ............. *A63F 13/67* (2014.09); *A63F 13/35* (2014.09); *A63F 13/537* (2014.09)

(58) Field of Classification Search
None
See application file for complete search history.

(56) References Cited

U.S. PATENT DOCUMENTS

| | | | | |
|---|---|---|---|---|
| 2010/0169667 A1* | 7/2010 | Dewan | ................... | G06F 21/57 713/193 |
| 2017/0142459 A1* | 5/2017 | Jarnikov | ................. | G06F 3/013 |
| 2018/0293837 A1* | 10/2018 | Hoehne | ............... | G07F 17/3223 |

* cited by examiner

*Primary Examiner* — Ronald Laneau
(74) *Attorney, Agent, or Firm* — Wayne Edward Ramage; Baker Donelson

(57) ABSTRACT

A system and related methods for allowing a player or user to load personalized or player-created content (such as graphics, sounds, and the like) into a game on a machine specifically for gaming, including, but not limited to, gambling or casino gaming. The player creates and uploads content to a remote content server, which reviews the content for acceptability, quality, and other standards, converts and scales the content to appropriate file types or standards, and stores it for later use. The player, when accessing a compatible machine, can request that the player-created content be downloaded into or otherwise available to the machine, where it replaces some or all of the standard content for a particular game.

18 Claims, 2 Drawing Sheets

SYSTEM AND METHOD FOR PROVIDING PLAYER DIRECTED CONTENT IN A GAMING MACHINE

This application claims benefit of and priority to U.S. Provisional App. No. 62/958,230, filed Jan. 7, 2020. U.S. Provisional App. No. 62/958,230, filed Jan. 7, 2020 is incorporated herein in its entirety by specific reference for all purposes.

FIELD OF INVENTION

This invention relates to a system and related methods for allowing a player or user to load personalized or player/user-created content into a game on a machine. More particularly, this invention relates to a system and related methods for loading personalized or player/user-created content into a casino gaming machine in place of standard game graphics.

BACKGROUND OF INVENTION

Electronic machines to provide various forms of electronic gaming, such as, but not limited to, electronic video poker games, electronic slot machines, electronic twenty-one games or electronic craps games are well known. Discussion of electronic gaming and related devices may be found in U.S. Pat. No. 5,109,973 (Wilcox, et al., issued May 28, 1991); U.S. Pat. No. 5,275,400 (Weingardt, et al., issued Jan. 4, 1994); U.S. Pat. No. 6,077,162 (Weiss, issued Jun. 20, 2000); U.S. Pat. No. 7,722,466 (Rothschild, issued May 25, 2010); and U.S. Pat. No. 8,460,109 (Bryson, et al., issued Jun. 11, 2013); all of which are incorporated herein in their entireties by specific reference for all purposes.

The industry continues to seek ways to attract gamers to particular games, and to maintain their engagement. The present invention provides a novel way to address that problem.

SUMMARY OF INVENTION

In various exemplary embodiments, the present invention comprises a system and related methods for allowing a player or user to load personalized or player/user-created content (e.g., graphics, sounds, and the like) into a game on a machine. In several embodiments, the machine is a machine specifically for gaming, including, but not limited to, gambling or casino gaming. In general, the player/user creates and uploads content to a remote content server, which reviews the content for acceptability, quality, and/or other standards, converts and scales the content to appropriate file types or standards, and stores it for later use. The player/user, when accessing a compatible machine, can request that the player/user-created content be downloaded into or otherwise available to the machine, where it replaces some or all of the standard content for a particular game.

The player uses an application to access the system to submit created content. This may include creating a player account. An example of such an account is a loyalty club program for a particular casino or gaming property or location. The account may be subject to review and authorization before permitting a player to submit created content.

The player uploads the player-created content through a secured content submission portal. The portal may be a specific application for content creation and submission downloaded and operating on a personal electronic or mobile computing device or a personal computer. In alternative embodiments, the portal may be accessed through an Internet web browser through a personal electronic or mobile computing device or a personal computer.

Upon submission, the system conducts a security scan of the submitted content to check for viruses, malware, or similar programs or issues. The system will convert the player content to appropriate file types, which may be standardized file types and forms, scan and review the content to ensure that it meets applicable laws (e.g., trademark, copyright) and standards, including public decency standards, and conduct further processing of the content, such as scaling the content to proper resolution and proportions suitable for the subsequent use of the content for particular gaming applications. The approved converted content is then stored in a system database.

In some embodiments, the content is stored in a player library accessible only by that player. The player may designate some or all of the content as "private," which limits its use to only that player. The player also may designate some or all of the content as "public," which allows the system to use that content for gaming applications for general use, including use for other players.

A player seeking to use their player-created content on a particular compatible gaming device or machine first logs into or otherwise indicates their desire to use the player-created content through the gaming device or machine. For example, a player may insert their casino loyalty club card into the device to identify themselves and activate their account at the property. In some embodiments, the player may then open the player-created content application on their mobile device (for example), and select the desired gaming machine or device (which may be presented on a menu in the application), followed by a selection of the particular stored personal content he or she wishes to download into the game. The system will then load the selected content into the active content library of the game. The player then plays the game on the gaming device or machine, and the selected personal content will then replace some or all of the in-game graphics and/or sounds. Graphics replaced may include some or all of the title graphics, gaming images, and awards graphics. The result of plays of the gaming device may be displayed on the gaming device screens that include the player's personal content. The player may receive bonus points or currency or similar loyalty club benefits (i.e., a benefit or reward outside of the game itself) if the player-created content appears in certain combinations or sequences within the game.

For casino gaming and similar uses, the player-contented content does not affect the substance or rules, including the odds, of the game being played. Similarly, the player cannot access or load content into a gaming machine or device directly. The gaming machine or device only accesses the player-created content through the system-based active content library for the game, which is strictly controlled by the system.

DETAILED DESCRIPTION OF EXEMPLARY EMBODIMENTS

In various exemplary embodiments, the present invention comprises a system and related methods for allowing a player or user to load personalized or player/user-created content (e.g., graphics, sounds, and the like) into a game on a machine. In several embodiments, the machine is a machine, such as, but not limited to, a kiosk, slot machine, or computing device, specifically for gaming, including, but not limited to, gambling or casino gaming. In general, the player/user creates and uploads content to a remote content server, which reviews the content for acceptability, quality, and/or other standards, converts and scales the content to appropriate file types or standards, and stores it for later use. The player/user, when accessing a compatible machine, can request that the player/user-created content be downloaded into or otherwise available to the machine, where it replaces some or all of the standard content for a particular game.

Figure 1:
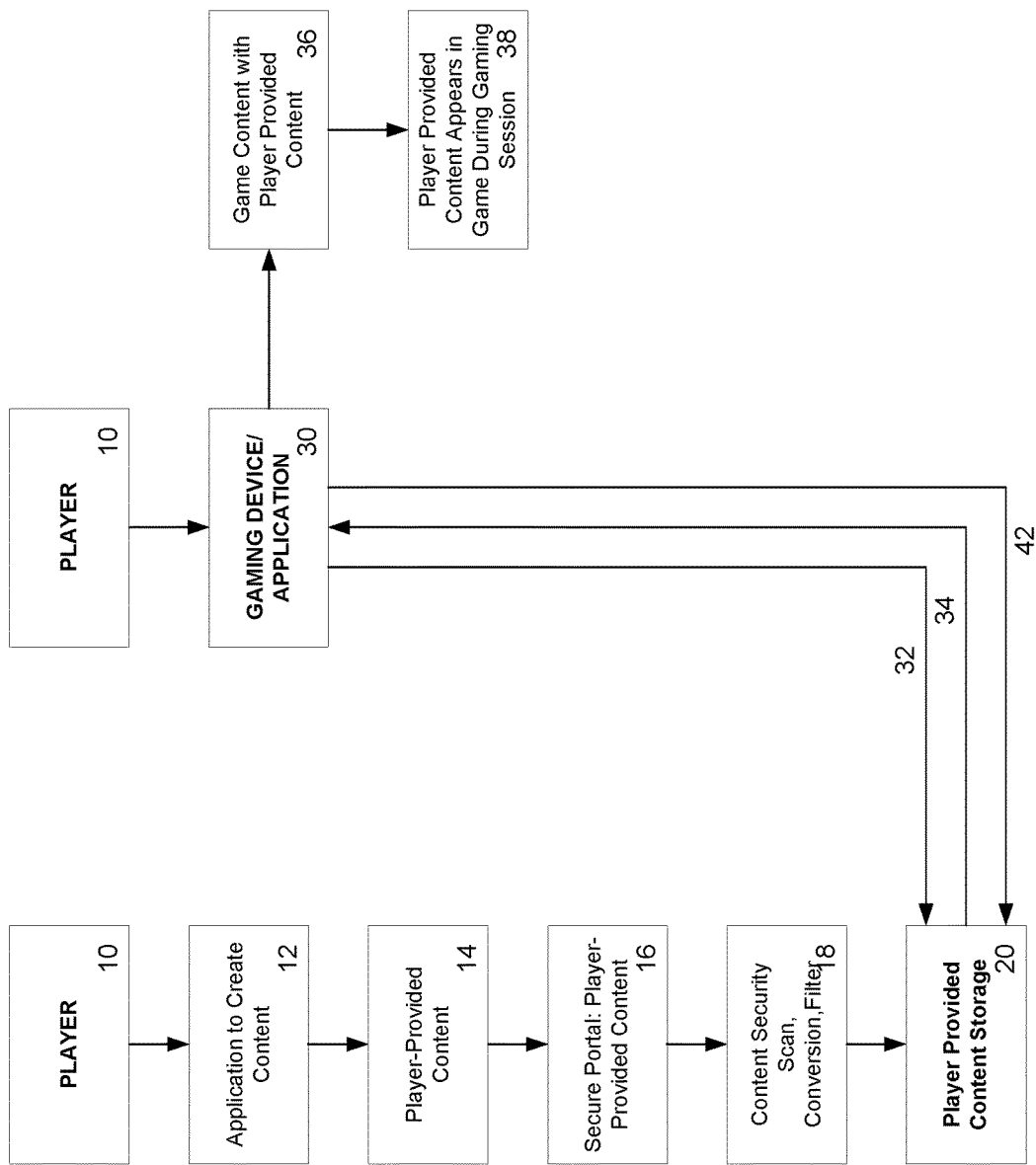
FIG. 1 shows a diagram of a process in accordance with an exemplary embodiment of the present invention.
Figure 2:
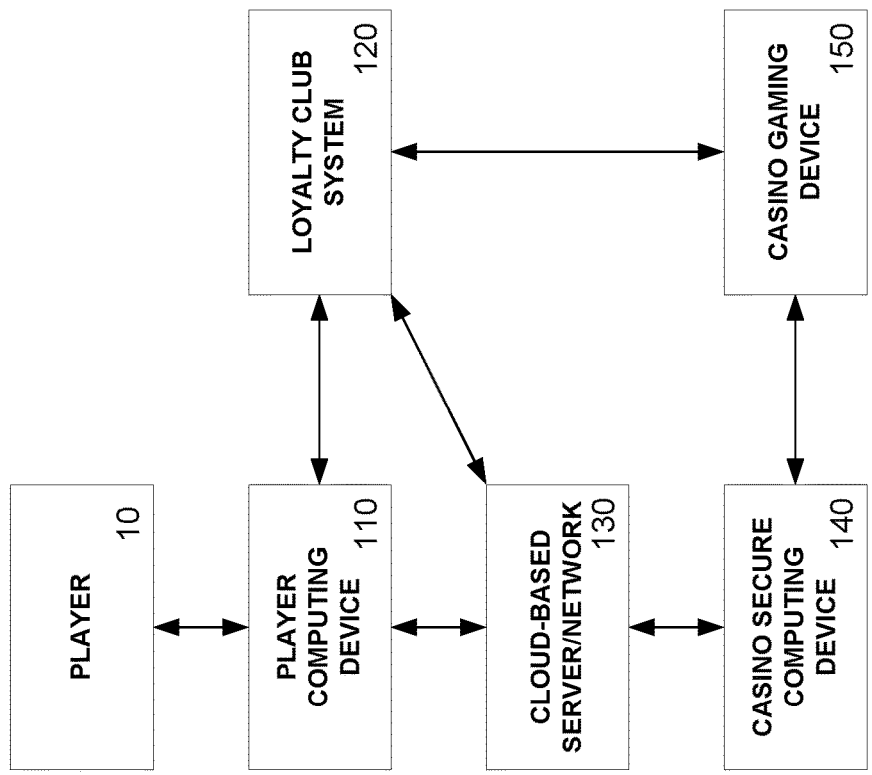
FIG. 2 shows a diagram of a system in accordance with an exemplary embodiment of the present invention.

FIG. 1 shows an exemplary embodiment of a system or process in accordance with the present invention. The player 10 uses an application 12, typically on a player computing device 110, such as, but not limited to, a personal computer, laptop computer, or mobile computing device, to access the system to submit player-created or player-provided content 14. This may include creating a player account with the system. An example of such an account is a loyalty club program or system 120 for a particular casino or gaming property or location. The player account may be subject to review and authorization before permitting a player to submit created content.

The player uploads the player-created content through a secured content submission portal 16 which may be located on a secure computing device or network at a casino or similar gaming location or property 140. The portal may be a specific application for content creation and submission that is downloaded and operating on a personal electronic or mobile computing device or a personal computer 110. In alternative embodiments, the portal may be accessed through an Internet web browser through a personal electronic or mobile computing device or a personal computer 110.

Upon submission, the system conducts a security scan 18 of the submitted content to check for viruses, malware, or similar programs or issues. The system will then convert the player content to appropriate file types, which may be standardized file types and forms, scan and review or filter the content to ensure that it meets applicable laws (e.g., trademark, copyright) and standards, including public decency standards, and conduct further processing of the content, such as scaling the content to proper resolution and proportions suitable for the subsequent use of the content for particular gaming applications. The approved, converted player-provided content is then stored in a system database or other form of digital storage 20.

In some embodiments, the content is stored in a player library accessible only by that player. The player may designate some or all of the content as "private," which limits its use to only that player. The player also may designate some or all of the content as "public," which allows the system to use that content for gaming applications for general use, including use for other players.

A player 10 seeking to use their player-created content on a particular compatible gaming device or machine 30, 150 first logs into or otherwise indicates their desire to use the player-created content through the gaming device or machine. For example, a player may insert their casino loyalty club card into the device to identify themselves and activate their account at the property. In some embodiments, the player may then open the player-created content application on their mobile device (for example), and select the desired gaming machine or device (which may be presented on a menu in the application), followed by a selection of the particular stored personal content he or she wishes to download into the game. The system will then request 32 and load 32 the selected content into the active content library 36 of the game. The player then plays the game on the gaming device or machine, and the selected personal content will then replace some or all of the in-game graphics and/or sounds 38. Graphics replaced may include some or all of the title graphics, gaming images, and awards graphics. The result of plays of the gaming device may be displayed on the gaming device screens that include the player's personal content. The player may receive bonus points or currency or similar loyalty club 120 benefits (i.e., a benefit or reward outside of the game itself) if the player-created content appears in certain combinations or sequences within the game 150.

For casino gaming and similar uses, the player-contented content does not affect the substance or rules, including the odds, of the game being played. Similarly, the player cannot access or load content into a gaming machine or device directly. The gaming machine or device only accesses the player-created content through the system-based active content library for the game, which is strictly controlled by the system.

After the player has completed his or her session on the gaming device or machine, he or she may have the created content removed from the active content library for that game. Alternatively, the player may allow their created content to return to the content storage 42 or remain in the active content library, where it may be used by other players, or selected by the system for use on that machine by other players. The system selection may be random or deliberate, such as choosing player-created content to use with a second player based on a common home city or region, a possible interest the second player may have in that particular content, or other information the system may have about the respective players.

In several embodiments, players would also have the ability to "like" player-provided content from other players, and the system would then have the ability to rate the content, based on the number of likes. The system could then present various player-provided content in order with ratings, or in order of rating, when the player opts to allow additional content to be included in game play, along with other random content.

The player who created the content may be able to earn bonus points or currency or similar loyalty club benefits by having their content be made public or left in the active library, based upon the use of that content or if certain combinations or sequences of their created content appear while other players are using the gaming device or machine. In some instances, the active library for a machine may periodically purge personal created content, which would require the player to re-load their created content into a machine's active library.

While the above invention has been described in the context of a player creating the content, created content may be obtained from other sources. For example, a commercial entity may provide certain content it creates, such as product images or logos, that can replace existing game content in the same manner as described above.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C #, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

The invention claimed is:

1. A gaming system, comprising:
   an electronic gaming machine comprising a housing with a display screen and a first microprocessor, wherein the first microprocessor is programmed to automatically display a computer-based game with standard content on the display screen to a first player engaging in playing said computer-based game;
   a remote content server with a server microprocessor in electronic communication with a communications network and a database, wherein prior to the first player initiating play of computer-based game on the electronic gaming machine, said server microprocessor is programmed to:
      automatically receive, over the communications network, from a first user computing device, proposed user-created content to replace some or all of the standard content in said computer-based game;
      automatically conduct a security scan of the proposed user-created content, said security scan configured to identify computer viruses or malware;
      automatically review the proposed user-created content for compliance with applicable intellectual property laws and decency standards;
      automatically convert the proposed user-created content to a standardized format;
      automatically process the standardized user-created content for use with one or more particular gaming applications, including said computer-based game; and
      automatically transmit the processed, standardized user-created content to the database for storage for subsequent use;
   further wherein the first microprocessor in the electronic gaming machine is programmed to:
      automatically log the first player in;
      receive a request from the first player to replace some or all of the standard content with the stored user-created content in the database provided by the first user;
      automatically transmit, over the communications network, a request to the remote content server to load the stored user-created content to an active content library for the computer-based game; and
      automatically initiate play of the computer-based game with some or all of the standard content replaced by the stored user-created content in the active content library.

2. The system of claim 1, wherein the first user is not the first player.

3. The system of claim 1, wherein the proposed user-provided content has been created on a computing device of the first user.

4. The system of claim 1, further comprising a second electronic gaming machine comprising a second housing with a second display screen and a second microprocessor, wherein the second microprocessor is programmed to automatically display a second computer-based game with standard content on the display screen to a second player engaging in playing said second computer-based game; and
   wherein the second microprocessor is programmed to initiate play of the second computer based game with some or all of the standard content replaced by the stored user-created content provided by the first user.

5. The system of claim 1, wherein the microprocessor is programmed to transmit information from the playing of the computer-based game to a loyalty club program or system.

6. The system of claim 1, wherein the gaming machine is located in a casino.

7. The system of claim 1, wherein the computer-based game is a gambling game.

8. The method of claim 1, wherein the proposed user-created content is received through a secured content submissions portal.

9. A system for providing player-created content to a gaming machine, comprising:
   a central system server, with a microprocessor, in electronic communication with a database, wherein the microprocessor is programmed to:
   receive, via electronic transmission over a communications network, proposed player-created content from a remote player computing device of a first player for use at least one computer-based game;
   automatically conduct a security scan of the proposed player-created content said security scan configured to identify computer viruses or malware;
   automatically review the proposed player-created content for compliance with applicable intellectual property laws and decency standards;
   automatically convert the proposed player-created content to a standardized format;
   automatically process the standardized player-created content for use with one or more particular gaming applications, including said at least one computer-based game; and
   automatically transmit the processed, standardized player-created content to the database for storage for subsequent use;
   wherein the player-created content is received, processed and stored in the database prior to initiation of play of said at least one computer-based game.

10. The system of claim 9, further wherein the microprocessor is programmed to:
    receive, via electronic transmission over the communications network, a request for the stored player-created content from a gaming machine;
    transmit, via electronic transmission over the communications network, the stored player-created content to the gaming machine.

11. The system of claim 10, further wherein the request for the stored player-created content from the gaming machine in initiated by the first player.

12. The system of claim 11, further wherein the transmitted stored player-created content replaces some or all of the content of said at least one computer-based game played by the first player on the gaming machine.

13. The system of claim 10, further wherein the request for the stored player-created content from the gaming machine in initiated by a second player.

14. The system of claim 13, further wherein the transmitted stored player-created content replaces some or all of the content of said at least one computer-based game played by the second player on the gaming machine.

15. The system of claim 9, further wherein the microprocessor is programmed to:
   transmit, via electronic transmission over the communications network, the stored player-created content to a gaming machine.

16. A method for providing player-created content to a gaming machine, comprising:
   receiving, over a communications network, at a remote content server with a server microprocessor in electronic communication with the communications network and a database, proposed user-created content to replace some or all of standard content in a computer-based game on a remote gaming machine;
   automatically conducting, using the microprocessor, a security scan of the proposed user-created content said security scan configured to identify computer viruses or malware;
   automatically reviewing, using the microprocessor, the proposed user-created content for compliance with applicable intellectual property laws and decency standards;
   automatically converting, using the microprocessor, the proposed user-created content to a standardized format;
   automatically processing, using the microprocessor, the standardized user-created content for use with one or more particular gaming applications, including said computer-based game; and
   automatically transmitting, using the microprocessor, the processed, standardized user-created content to the database for storage for subsequent use;
   receiving, over the communications network, a request from the gaming machine to replace some or all of the standard content in the computer-based game with the stored user-created content in the database; and
   automatically loading the stored user-created content to an active content library for the computer-based game.

17. The method of claim 16, wherein the request from the gaming machine is initiated by a player who created the user created content.

18. The method of claim 16, wherein the request from the gaming machine is initiated by a player who did not create the user created content.

\* \* \* \* \*

UNITED STATES PATENT AND TRADEMARK OFFICE
CERTIFICATE OF CORRECTION

| | |
|---|---|
| PATENT NO. | : 11,583,775 B1 |
| APPLICATION NO. | : 17/143767 |
| DATED | : February 21, 2023 |
| INVENTOR(S) | : Gregory D. Guida and Lester J. McMackin, III |

It is certified that error appears in the above-identified patent and that said Letters Patent is hereby corrected as shown below:

On the Title Page

Item (71) In Applicants, delete "McMakin" and insert -- McMackin -- therefor.

Item (72) In Inventors, delete "McMakin" and insert -- McMackin -- therefor.

Signed and Sealed this
Second Day of July, 2024

*Katherine Kelly Vidal*

Katherine Kelly Vidal
*Director of the United States Patent and Trademark Office*